Feb. 9, 1932. G. E. STACK 1,844,699
WIRE DRAWING APPARATUS
Filed June 26, 1930
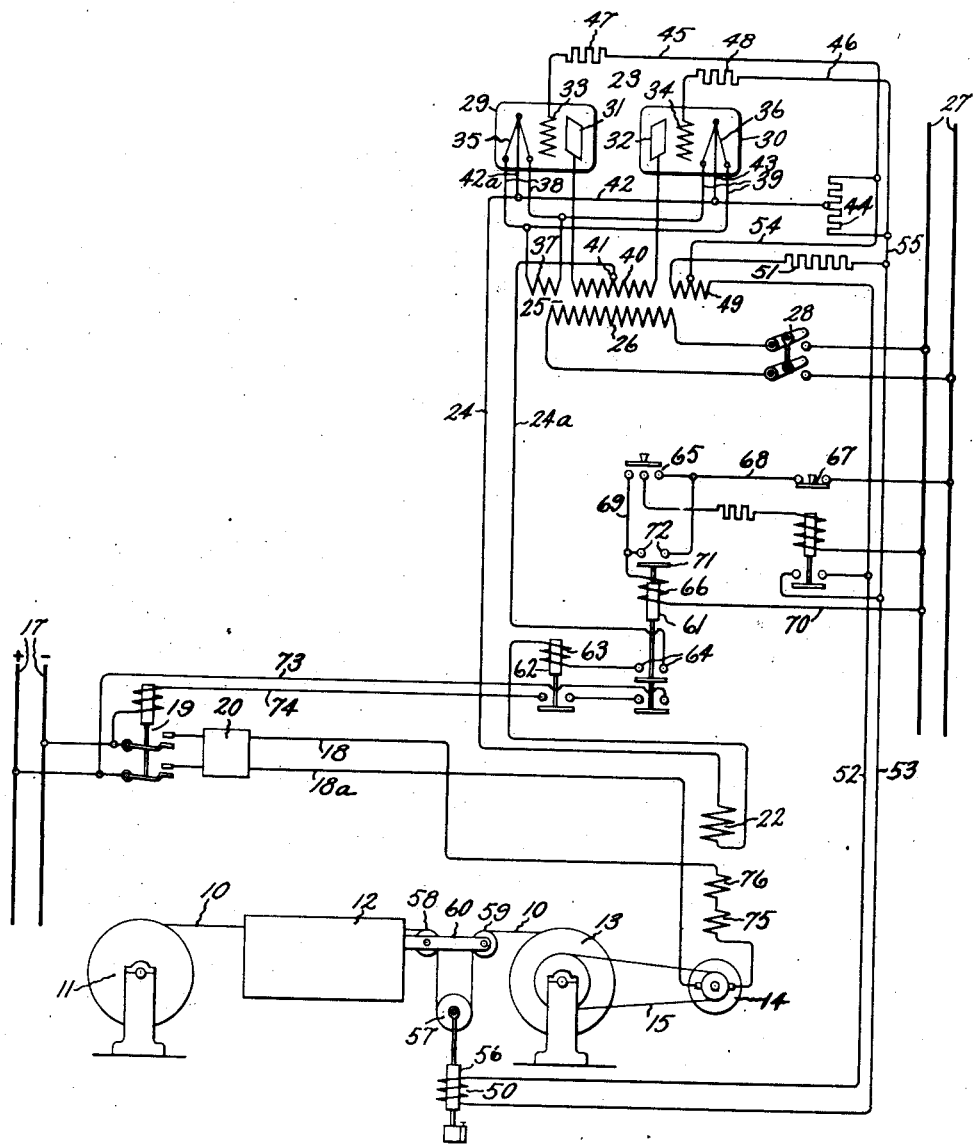
Inventor:
George E. Stack,
by Charles E. Tullar
His Attorney.

Patented Feb. 9, 1932

1,844,699

UNITED STATES PATENT OFFICE

GEORGE E. STACK, OF BALLSTON SPA, NEW YORK, ASSIGNOR TO GENERAL ELECTRIC COMPANY, A CORPORATION OF NEW YORK

WIRE DRAWING APPARATUS

Application filed June 26, 1930. Serial No. 464,094.

This invention relates to control devices, more particularly to devices for controlling the operation of translating devices such for example as electric motors employed to drive the reeling drums of wire drawing machines and the like, and has for an object the provision of a simple, reliable and efficient device of the kind for maintaining the tension of the wire substantially constant during the drawing process.

In illustrating this invention in one form thereof, I have shown it as embodied in a wire drawing apparatus in which wire is drawn from a feed reel through diameter reducing dies after which it is reeled by means of a motor driven rereeling drum upon which the wire is reeled as it is drawn, and accordingly a further object of this invention is the provision of means for gradually reducing the speed of the motor which drives the drum so as to maintain the tension of the drawn wire substantially constant despite the increasing diameter of the reel of drawn wire.

In carrying the invention into effect in one form thereof electric discharge apparatus controlled by the drawn wire is employed to control the speed of the motor responsively to the variations in the tension of the wire. More specifically the field winding of the reel drive motor is connected in the output circuit of the electric discharge apparatus and a variable reactance controlled by the drawn wire is employed to vary the phase relationship between the electromotive forces which are applied to the input and output circuits of the electric discharge apparatus so as to vary the field current of the motor and consequently its speed in accordance with variations in the tension of the drawn wire.

For a better and more complete understanding of the invention reference should now be had to the accompanying drawing the single figure of which is a diagrammatical representation of an embodiment of the invention.

Referring now to the drawing, the wire 10 is drawn from a full reel 11 through diameter reducing dies or similar work performing device, such for example as that diagrammatically represented in the drawing by the reference character 12, and is reeled by means of a rereeling drum 13, which is driven by a suitable translating device such for example as the electric motor 14 to the drive shaft of which the drum 13 is mechanically connected by means of the belt 15.

Direct current is supplied to the armature of the drive motor 14 from a suitable source such for example as that represented by supply lines 17 to which the terminals of the armature are connected by means of the conductors 18 and the contacts of the armature contactor 19 when the latter is operated to its upper or closed position. The motor 14 may be started from rest by means of a suitable automatic starting device 20 such as that which is diagrammatically represented in the drawing.

The motor 14 is also provided with a separately excited shunt field winding 22 which is supplied with direct current from suitable electric discharge apparatus 23 in the output circuit 24, 24a of which it is connected, the electric discharge apparatus 23 being in turn supplied with alternating current through a power transformer 25 the primary winding 26 of which is connected to a suitable source of alternating current, such for example as that represented in the drawing by the conductors 27, by means of a switching device 28.

The electric discharge apparatus 23 is shown as comprising two separate electric discharge devices 29 and 30. These devices are of the three-electrode type as shown, they being respectively provided with plates or anodes 31 and 32, grids 33 and 34 and filamentary cathodes 35 and 36. Although the electric discharge devices 29 and 30 may be of any suitable type, they are preferably of the three electrode type into the envelopes of which a small quantity of an inert gas or vapor, such for example as mercury vapor, is introduced after exhaust, the presence of the inert gas within the envelope serving to permit of the formation of an arc discharge and thus constituting the devices electrostatically or grid controlled arc rectifiers. A characteristic of vapor electric devices of this nature is that the expenditure of a very small amount of power in the grid or input circuit serves to control a very large amount of power in the plate or output circuit of the apparatus. The cathodes 35 and 36 are heated to the necessary degree of incandescence by alternating current respectively supplied thereto from the secondary winding 37 of the filament transformer whose primary is the winding 26 to the opposite terminals of which the cathodes 35 and 36 are connected in parallel by means of the conductors 38 and 39.

As shown in the drawing the electric discharge devices 29 and 30 are connected for rectifying the full wave of the alternating electromotive forces supplied from the source 27; that is to say, the plates or anodes 31 and 32 of the devices are respectively connected to the opposite terminals of the secondary winding 40 of the anode transformer, the mid point 41 of which is connected through the output circuit 24, 24a to a common conductor 42, which as shown in the drawing, is connected to the mid points of the cathodes 35 and 36 by means of conductors 42ª and 43.

Alternating electromotive forces are applied to the grids 33 and 34 of the electric discharge devices by means of a grid supply resistor 44, to the opposite terminals of which the grids are respectively connected by means of the conductors 45 and 46, suitable protective resistances 47 and 48 being included in the circuit with the grids. The electromotive forces supplied to the grid supply resistor 44 are derived from a local electric circuit comprising the secondary winding 49 of a grid transformer, the solenoid 50 of a reactance device, and a resistor 51, all connected in series relationship with each other by means of conductors 52 and 53, one terminal of the grid supply resistor 44 being connected to the midpoint of the secondary winding 49 of the grid transformer whose primary is the winding 26 by means of the conductor 54 and the opposite terminal of the resistor being connected to the common point between the reactance winding 50 and the resistance 51 by means of conductor 55.

As will be well understood by persons skilled in the art the current which flows in the output circuit 24, 24a of the electric discharge apparatus 23 may be varied as desired by varying the phase relationship between the alternating electromotive forces which are respectively supplied to the grids and anodes of the electric discharge devices 29 and 30. For this purpose the reactance device is provided with a movable soft iron core 56 for varying the reactance of the circuit including the reactance winding 50 is supported by a rider pulley 57, which in turn is supported in a loop of the drawn wire 10 which is formed between the pulleys 58 and 59 supported upon the frame of the machine 12 by means of a supporting member 60. A variation in the position of the movable core member 56 within the winding 50 of the reactance device effects a variation in the effective length of the air gap of the magnetic circuit of this device. This variation in the air gap produces a corresponding variation in the reluctance of the magnetic circuit, as a result of which the reactance of the electrical circuit including the reactance winding 50 and consequently the phase relationship of the electromotive force thereof are correspondingly varied. The reactance of the reactance device 50 is variable between a maximum when the core member 56 is in its lower position and a minimum when the core is in its upper position. Variation of the position of the core member 56 in the winding 50 thus serves to vary the phase relationship between the alternating electromotive forces supplied to the anods 31 and 32 and the electromotive forces supplied to the grid members 33 and 34 and thus serves to vary the current supplied through the output circuit 24, 24a to the field winding 22 of the motor, and consequently serves to vary the speed of the motor in accordance with variations in the tension of the drawn wire 10.

A suitable contactor 61 is connected in the output circuit 24, 24a of the electric discharge apparatus and serves when operated to its upper or closed position to connect the field winding 22 of the motor in the output circuit 24, 24a of the electric discharge apparatus. The energizing winding of the armature contactor 19 is controlled by means of a control relay 62 the energizing winding 63 of which is connected in the output circuit 24, 24a in series relationship with the field winding 22 by means of the auxiliary contacts 64 when the field contactor 61 is in its closed position.

A starting switch diagrammatically shown in the drawing as a push button 65 serves when depressed, to complete a circuit for the energizing winding 66 of the field contactor, this circuit being traced from one side of the supply source 27 through a stop button 67 over conductor 68, movable and stationary contacts 65, conductors 69, windings 66 and thence by way of conductor 70 to the opposite side of the supply source 27. The field contactor 61 is further provided with an auxiliary contact 71 which in the upper or closed position of the contactor serves to bridge the stationary contact 72 and thus to complete a holding circuit for the energizing winding 66 of the contactor independent of the starting button 65 which may then be released.

With the above understanding of the elements and apparatus comprising my invention, its operation will be readily grasped and easily understood from the description which follows.

With the various controlling switches in the open position in which they are shown in the drawing, the apparatus will all be at rest. The electric discharge apparatus 23 is energized by operating the switch 28 to the closed position to connect the primary winding 26 of the power transformer to the source 27. After the filamentary cathodes 35 and 36 have been heated to the necessary degree of incandescence the electric discharge apparatus 23 will be in readiness to supply a rectified current to the output circuit 24, 24a.

Depression of the starting button 65 serves to operate the field contactor 61 to its upper or closed position thereby connecting the field winding 22 in the output circuit 24, 24a of the electric discharge apparatus, this circuit being traced from either of the cathodes 35, 36 to the conductor 24, through the field winding 22, energizing winding 63 of control relay 62, main contact 64 of field contactor 61, conductor 24a, to the midpoint 41 of the secondary winding of the anode transformer and then to either of the anodes 31 or 32. The flow of current in the energizing winding 63 will cause the control relay 62 to be operated to its upper position in which it completes a circuit for the energizing winding of the armature contactor 19, this circuit being traced from the positive side of the direct current supply source 17 by way of conductor 73, lower auxiliary contacts of field contactor 61, main contacts of control relay 62, conductor 74, coil of armature contactor 19 and thence to the negative side of the supply source 17. Contactor 19 in response to the energization of its coil moves to the upper or closed position in which it completes a circuit for the armature of motor 14, which circuit may be traced from the positive side of the supply source 17 through lower contact of contactor 19, automatic starting device 20, conductor 18a, armature of motor 14, series and connecting field windings 75 and 76, conductor 18, upper contact of armature contactor to the negative side of the supply source 17.

The energization of the armature and field windings of the motor 14 causes it to rotate and to drive the rereeling drum 13, which thereupon winds the wire 10 drawn through the diameter reducing dies 12 to form a reel the diameter of which increases as the drawing process proceeds. The movable core member 56 will assume a position that is dependent upon its weight and consequently the tension in the loop of the drawn wire will depend upon the weight of the core member 56.

As long as the speed of the motor 14 and the rereeling drum 13 is such that the tension of the wire 10 remains at the desired value the control apparatus will remain inactive. However, should the tension of the wire 10 increase above this predetermined value for any reason, such as an unexpected increase in the speed of the motor, the core member 56 will move upwardly in the reactance coil 50, thereby changing the reactance of the circuit across which the grid supply resistor 44 is connected and thereby shifting the phase relationship between the electromotive forces applied to the anodes 31 and 32 and the grids 33 and 34 in such a manner as to increase the current through the output circuit 24, 24a to the field winding 22, thereby reducing the speed of the motor 14 and permitting the tension in the wire 10 to decrease.

Should the tension in the wire 10 decrease below the predetermined value the core member 56 will descend under the attraction of gravity thereby shifting the phase relationship between the grid and anode potentials of the electric discharge devices 29 and 30 in such a manner as to decrease the current supply through the output circuit 24, 24a and the field winding 22 and thereby increasing the speed of the motor.

It will thus be seen that any variation in the tension of the wire 10 effects a variation in the reactance of the circuit including the winding 50 of the reactance device and also effects a variation in the phase relation between the grid and anode potentials of the electric discharge apparatus and consequently the current supplied to the field winding 22 of the motor in such a manner as to change the speed of the motor to restore the tension in the wire 10 to the desired value.

If the speed of the motor 14 remained constant, there would be a tendency for the tension in the wire 10 to increase as the drawing process progressed due to the increase in diameter of the reel of drawn wire on the rereeling drum 13. Any tendency of the tension in the wire 10 to increase, however, results in the above described operation of the core 56 to increase the current flowing in field winding 23 of the motor and thus to reduce its speed so as to maintain the tension in the wire 10 substantially constant.

In the event of failure of the alternating current source 27, the energizing winding 66 of field contactor will become deenergized and the contactor will descend to its lower position in which it interrupts the energizing circuit for the armature contactor 19 and permits the latter to open and interrupt the armature circuit of the motor. Similarly in the event of failure of either or both of the electric discharge devices 29 or 30, the output circuit 24, 24a in which the energizing coil of the control relay 62 is connected will become currentless and will thus permit the control relay to descend to its lower position to interrupt the armature circuit. It will thus be clear that the armature contactor is interlocked both with the alternating current source 27 and with the field circuit of the motor, and consequently the motor is protected at all times against failure of field excitation.

Although in accordance with the provision of the patent statutes, I have described this invention as embodied in concrete form, I would have it understood that the invention is not limited to the particular apparatus and connections shown and described, which are merely illustrative, since alterations and modifications will readily suggest themselves to persons skilled in the art without departing from the true spirit of this invention or the scope of the annexed claims.

What I claim as new and desire to secure by Letters Patent of the United States, is:

1. In combination, a translating device, an electric discharge device for controlling said translating device, a variable air gap reactance device for controlling said electric discharge device, and means responsive to an operating condition of said translating device for varying the air gap of said reactance device.

2. In a control system, a translating device, means for controlling an operating condition of said translating device comprising a source of alternating current and an electric discharge device provided with a control grid, an impedance phase shifting circuit energized from said source for controlling said grid, a resistance and a variable air gap reactance device included in said circuit, and means responsive to an operating condition of said translating device for varying the air gap of said reactance device.

3. In a control system for an electric motor, means comprising an electric discharge device for controlling the speed of said motor, a variable air gap reactance device for controlling said electric discharge device, and means responsive to the load condition of said motor for varying the air gap of said reactance device.

4. In a control system, an electric motor for performing an operation upon a length of material, an electric discharge device for controlling an operating condition of said motor, a variable reactance device for controlling said electric discharge device, and means controlled by said material for varying the reactance of said reactance device.

5. In a control system an electric motor for performing an operation upon a length of material, means for controlling the speed of said motor comprising a source of alternating current and an electric discharge device provided with a controlling grid, an impedance phase shifting circuit energized from said source for exciting said grid, a resistance and a variable air gap reactance device included in said circuit and means including a loop in said length of material and a device supported therein for varying the air gap of said reactance device in accordance with variations in said loop.

6. In wire drawing apparatus and the like, the combination with a motor having armature and field circuits and a drum driven by said motor for drawing the wire, of means including electric discharge apparatus having an input circuit and an output circuit connected to one of said motor circuits and controlled by said input circuit for controlling the speed of said motor, means for applying alternating electromotive forces to said input and output circuits, and means responsive to variations in the tension of said wire for varying the phase relationship between said electromotive forces to vary the current in said output circuit.

7. In wire drawing apparatus and the like the combination with a motor for drawing the wire, of means including electric discharge apparatus having an input circuit and an output circuit controlled by said input circuit and connected to said motor for controlling the speed thereof, means for applying alternating electromotive forces to said circuits, and means including a variable reactance for responding to variations in the tension of the wire to vary the phase relationship between said electromotive forces to cause said first mentioned means to vary the speed of said motor.

8. In wire drawing apparatus and the like the combination with a drive motor of an electric circuit including a reactance, means including a loop in the drawn wire and a core member supported movably therein for varying said reactance in accordance with variations in the tension of the drawn wire, and means including electric discharge apparatus for controlling the speed of said motor in response to the variations of said reactance.

9. In wire drawing apparatus and the like, the combinaton with a motor for drawing the wire, of means for controlling the effort of said motor, said means comprising electric discharge apparatus provided with an input circuit and with an output circuit connected to the motor, means for supplying alternating electromotive forces to said circuits, means including a reactance for controlling the phase relationship between said electromotive forces to control the current in said output circuit, and means including a loop in the drawn wire and a core member supported therein for varying said reactance in accordance with variations in the tension in the drawn wire.

10. In wire drawing apparatus and the like, the combination with a drive motor provided with an armature circuit and a field circuit, of means including electric discharge apparatus connected to a source of alternating current for supplying direct current to said field winding, and means responsive to a failure of circuit in said field circuit for interrupting said armature circuit.

11. In wire drawing apparatus and the like the combination with a drive motor provided with an armature circuit and a field circuit, of means including electric discharge apparatus connected to a source of alternating current for supplying direct current to said field winding and means responsive to failure of said alternating current source for interrupting said armature circuit.

In witness whereof, I have hereunto set my hand this 25th day of June, 1930.

GEORGE E. STACK.